United States Patent
Silver et al.

(10) Patent No.: US 6,834,103 B1
(45) Date of Patent: Dec. 21, 2004

(54) CALLER CONTROL OF CALL WAITING SERVICES

(75) Inventors: Edward M. Silver, Atlanta, GA (US);
Linda A. Roberts, Decatur, GA (US);
Hong T. Nguyen, Atlanta, GA (US)

(73) Assignee: Bellsouth Intellectual Property Corporation, Wilmington, DE (US)

( * ) Notice: Subject to any disclaimer, the term of this patent is extended or adjusted under 35 U.S.C. 154(b) by 442 days.

(21) Appl. No.: 10/109,783

(22) Filed: Mar. 29, 2002

(51) Int. Cl.[7] .............................................. H04M 3/42
(52) U.S. Cl. .............................. 379/215.01; 379/201.01
(58) Field of Search ....................... 379/215.01, 201.01, 379/201.12, 204.01, 207.02, 207.14, 207.15, 210.01, 210.02, 219, 221.08, 93.35, 230; 455/415, 414, 567

(56) References Cited

U.S. PATENT DOCUMENTS

| | | | |
|---|---|---|---|
| 5,428,663 A | 6/1995 | Grimes et al. ................. | 379/57 |
| 5,615,253 A | 3/1997 | Kocan et al. ................. | 379/196 |
| 6,067,353 A | * 5/2000 | Szeliga ..................... | 379/93.35 |
| 6,160,877 A | * 12/2000 | Tatchell et al. ............. | 379/197 |
| 6,236,722 B1 | * 5/2001 | Gilbert et al. .............. | 379/230 |
| 6,289,092 B1 | * 9/2001 | Nishiara ................. | 379/215.01 |
| 6,442,259 B2 | 8/2002 | Culli et al. ............ | 379/114.05 |
| 6,591,115 B1 | * 7/2003 | Chow et al. ................. | 455/555 |
| 2002/0077089 A1 | * 6/2002 | Contreras | |

OTHER PUBLICATIONS

U.S. Appl. No. 10/113,391, filed Mar. 29, 2002, entitled "Caller Control of Call Forwarding Services", Inventors: Silver et al.

* cited by examiner

Primary Examiner—William J. Deane, Jr.
(74) Attorney, Agent, or Firm—Merchant & Gould

(57) ABSTRACT

A method and system are provided for caller control of telephone calls placed to telephone lines provisioned with a call waiting feature. A call waiting control feature is provisioned at the local telephone switch of the calling party. After a directory number of a called party is entered, a determination is made as to whether the called party has a call waiting feature, and if so, whether her telephone line is busy. If the line has an activated call waiting feature and the line is busy, the call attempt is terminated. If the called party's line does not have a call waiting feature, or if the line does have call waiting, but the called party's line is not busy, the call attempt proceeds. If the call attempt is to be terminated, a message may be played to the caller to alert the caller that the called party's line is busy, that a call waiting feature is activated on the called party's line, and that the call attempt is being terminated. The call waiting control method and system may be switch-based where the determinations as to the call waiting status and busy status of the called party's line are made from information from the called party's switch. Alternatively, the call waiting control method and system may be network-based where the determinations as to the call waiting status and busy status of the called party's line are made at a network component such as a service control point.

25 Claims, 3 Drawing Sheets

CALLER CONTROL OF CALL WAITING SERVICES

FIELD OF THE INVENTION

This invention relates to a method and system for allowing a caller to control calls placed to a called party where the called party has activated a call waiting feature on her local telephone line.

BACKGROUND OF THE INVENTION

A growing number of call processing features are available to users of telecommunications systems. For example, features such as call waiting, call forwarding, voice messaging, and caller identification provide subscribers with desired information and allow subscribers to exercise some control over outgoing and incoming telephone calls. Call waiting is a feature of phone systems that allows a called party to know that a calling party is trying to dial into the telephone directory number of the called party. According to typical call waiting systems, if a called party line is busy with a current telephone call, an incoming telephone call from a calling party is indicated to the called party by the presentation of a beep or tone to the called party that is audible to the called party, but not to the party that is currently connected to the called party. The called party may select the incoming call from the calling party-by hitting the touch hook on the called party's telephone, or the called party may simply ignore the indication of the incoming call.

The calling party placing a call to a called party utilizing a call waiting feature has no way of knowing that the called party will be notified of the incoming call via the called party's call waiting feature. Often, a calling party would rather not interrupt a telephone call being conducted by the called party via the called party's call waiting feature. For example, if the calling party desires to place a call to the called party to convey a brief social message such as a lunch invitation to the called party, the calling party may not wish to have the called party interrupted by the call waiting feature just so that the calling party may invite the called party to lunch. The called party may be engaged in an important telephone call, and the calling party may not wish to disturb the current telephone call.

There is a need in the art for a method and system for allowing a calling party to exercise control over telephone calls placed to a called party whose telephone line is provisioned with an activated call waiting feature. It is with respect to these and other considerations that the present invention has been made.

SUMMARY OF THE INVENTION

In accordance with the present invention, the above and other problems are solved by a method and system for allowing a calling party to exercise control over telephone calls placed to a called party whose telephone line is provisioned with an activated call waiting feature. A call waiting control feature is selected at the local telephone switch of the calling party on a call-by-call basis. Alternatively, the call waiting control feature may be provisioned at the switch for all outgoing calls. After a directory number of a called party is entered, a determination is made as to whether the called party has a call waiting feature provisioned on her telephone line, and if so, whether her telephone line is busy.

If the called party does have a call waiting feature on her line, a determination is made as to whether that feature has been activated on the called party's line. If an activated call waiting feature is provisioned on the called party's line, a determination is made as to whether the called party's line is currently busy. If an activated call waiting feature is provisioned on the called party's line and the called party's line is busy, the caller's switch is instructed to terminate the call attempt. If an activated call waiting feature is not provisioned on the called party's line, or if an activated call waiting feature is provisioned on the called party's line, but the called party's line is not busy, the caller's switch is instructed to proceed with the call attempt. If the call attempt is to be terminated, a message may be played to the caller to alert the caller that the called party's line is busy, that a call waiting feature is activated on the called party's line, and that the call attempt is being terminated.

According to one aspect of the present invention, the call waiting control method and system are switch-based where the determinations as to the call waiting status and busy status of the called party's line are made from information obtained from the called party's switch. According to another aspect, the call waiting control method and system are network-based. According to the network-based method and system, the determinations as to the call waiting status and busy status of the called party's line are made at a network component such as a service control point or service node that is tasked with providing call waiting services for the called party.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION OF THE PREFERRED EMBODIMENT

The following description of an exemplary embodiment of the present invention as made with reference to the above-described drawings wherein like numerals refer to like parts or components throughout the several figures. The present invention is directed to a method and system for allowing a calling party to exercise control over telephone calls placed to a called party whose telephone line is provisioned with an activated call waiting feature.

Exemplary Operating Environment

Figure 1:
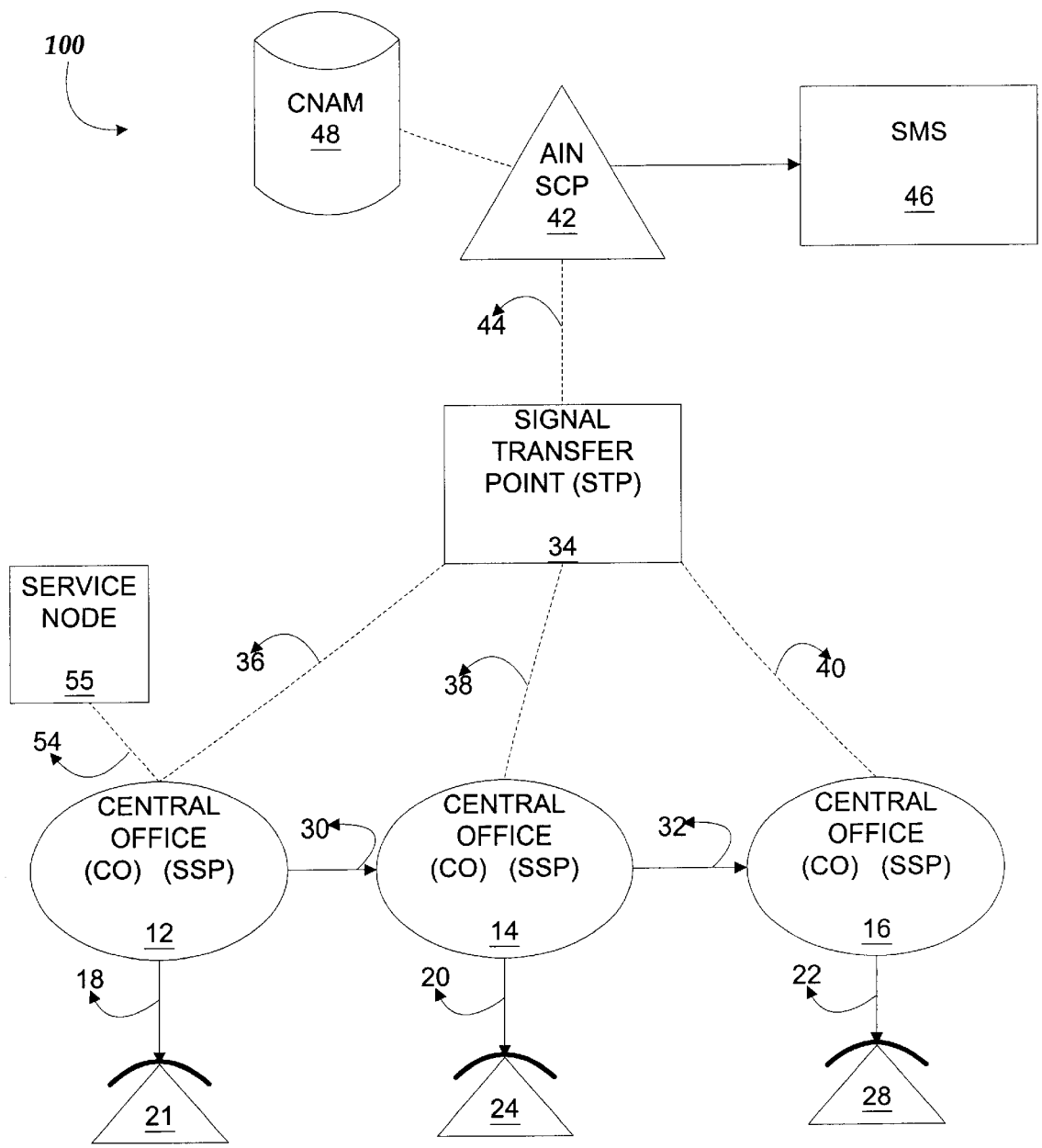
FIG. 1 is a block diagram illustrating components of a telecommunications network that provides an exemplary operating environment for the present invention.

It is advantageous to describe an exemplary operating environment in which the present invention may operate. FIG. 1 is a block diagram illustrating an exemplary operating environment for an embodiment of the present invention and includes a general description of a modern public switched telephone network through which the present invention preferably operates. The modern public switched telephone network (PSTN) has separate signaling paths for voice signals (or other customer-utilized communication circuits) and for control signals, which include information transmitted throughout the network to control the connection and disconnection of the voice circuits.

The public switched telephone network that evolved in the 1980s also incorporated the advanced intelligent network (AIN). Some of the components of the advanced intelligent network are illustrated in FIG. 1. The advanced intelligent network (AIN) uses the signaling system 7 (SS7) network for signal or system control message transport. The components thereof are well known to those skilled in the art. The operation of many of the components of the advanced intelligent network is also described in U.S. Pat. No. 5,245,719 to Weisser entitled "Mediation of Open Advanced Intelligent Network Interface by Shared Execution Environment" which is incorporated herein by reference. The SS7 communications protocol is provided in the document entitled "Bell Communications Research Specification of Signaling System 7," Document TR-NWT-000246, Issue 2 (June 1991), plus Revision 1 (December 1991), which is also incorporated herein by reference.

Referring still to FIG. 1, a plurality of central offices is provided in a typical public switched telephone network. Each central office may include an electronic switch known to those skilled in the art as a service switching point (SSP). These are indicated in FIG. 1 as SSP switches 12, 14, and 16. The number of SSP switches depends on the number of subscribers to be served by the public switched telephone network. An SSP is the AIN component of a typical electronic central office switch used by a local exchange carrier. The terms "SSP" and "switch" are used interchangeably hereinafter and are understood to refer to a telecommunications switch having AIN capability and which may be utilized for connecting voice channel circuits, including voice channel lines, such as trunk circuits 30 and 32.

Central offices switches (SSP) 12, 14, and 16 have a plurality of subscriber lines 18, 20, and 22 connected thereto. Each of the subscriber lines 18, 20, and 22 is connected to a terminating piece or pieces of customer premises equipment that are represented by telephone sets 21, 24 and 28. SSP switches 12, 14, and 16 are connected by a plurality of trunk circuits indicated as 30 and 32 in FIG. 1. These are the voice path trunks that interconnect the central offices 12, 14, and 16 and over which calls are connected when completed.

Each piece of terminating equipment in the PSTN is preferably assigned a directory number. The term "directory number" is used herein in a manner consistent with its generally understood meaning of a number that is dialed or input by an originating party at an originating station to reach a terminating station associated with the directory number. A directory number, typically a ten digit number, is commonly referred to as a "telephone number" and may be assigned to a specific telephone line, such as the telephone line 18 shown in FIG. 1.

Much of the intelligence, and the basis for many of the enhanced features of the network, resides in the local service control point (SCP) 42 that is connected to signal transfer point 34 via SS7 data link 44. As is known to those skilled in the art, service control points, such as SCP 42, are physically implemented by relatively powerful fault tolerant computers. Among the functions performed by the service control points is maintenance of network databases used in providing enhanced services. The SCP 42 is also connected to a caller ID with name (CNAM) database 48. The CNAM database comprises a plurality of directory numbers along with associated names for the directory numbers. The CNAM database may be used to provide a look-up database to provide caller ID service.

In operation, the intelligent network elements of the AIN 10, as described above, communicate with each other via digital data messages transmitted over the network of digital data links. An SSP may be configured to interface with these network elements through the use of a trigger. A trigger in the network is an event associated with a particular subscriber line or call that causes the SSP to generate a data packet message to be sent to a service control point. In order to keep the processing of data and calls as simple and generic as possible at central office switches, such as SSP central office switches 12, 14, and 16, a relatively small set of triggers are defined at the SSP central office switches for each call.

The message created by an SSP 12 in response to a trigger is known as a "query" message. A query message opens a "transaction" and the SSP generally holds the communication until it receives a reply from an appropriate network element via the network of digital data links instructing the SSP 12 to take a certain action. If the SSP 12 receives no instructions within a certain amount of time, the SSP "times-out" and executes a default task for the communication. The reply to the query message may be a "conversation" message or a "response" message. Conversation messages allow for bi-directional exchanges between network elements while the transaction remains open. A "response" message closes the transaction opened by the query message, and usually instructs the SSP 12 to route the held communication for connection with a terminating station. Query messages, conversation messages, and response messages are standard types of messages defined by the AIN protocol. The details of the AIN protocol are known to those skilled in the art and will not be further described herein. For more information regarding the AIN protocol, see Bellcore Specification GR-1298-CORE Switching Systems Generic Requirements for AIN 0.1, which is incorporated herein by reference.

The modem Advanced Intelligent Network also includes service nodes (SN) such as service node 55 shown in FIG. 1. Those skilled in the art are familiar with service nodes, which are physically implemented by the same types of computers that embody the SCP 42. In addition to the computing capability and data base maintenance features, service nodes 55 use ISDN lines and may include DTMF signal recognition devices, tone generation devices, text to speech (TTS) voice synthesis devices and other voice or data resources. As shown in FIG. 1, the connection is through the SSP. For example SN 55 is connected to SCP 42 via ISDN links 54 to SSP 12, ISDN/SS7 protocol conversion in SSP 12, and SS7 links 36 and 44. It is understood that the service node 55 may also be connected to a service management system 46, but such connection is not shown in FIG. 1. Service nodes 55 are used principally when some custom feature or service is needed that requires an audio connection to the call or transfer of a significant amount of data to a subscriber over a switched connection during or following a call.

Operation of an Exemplary Embodiment

Figure 2:
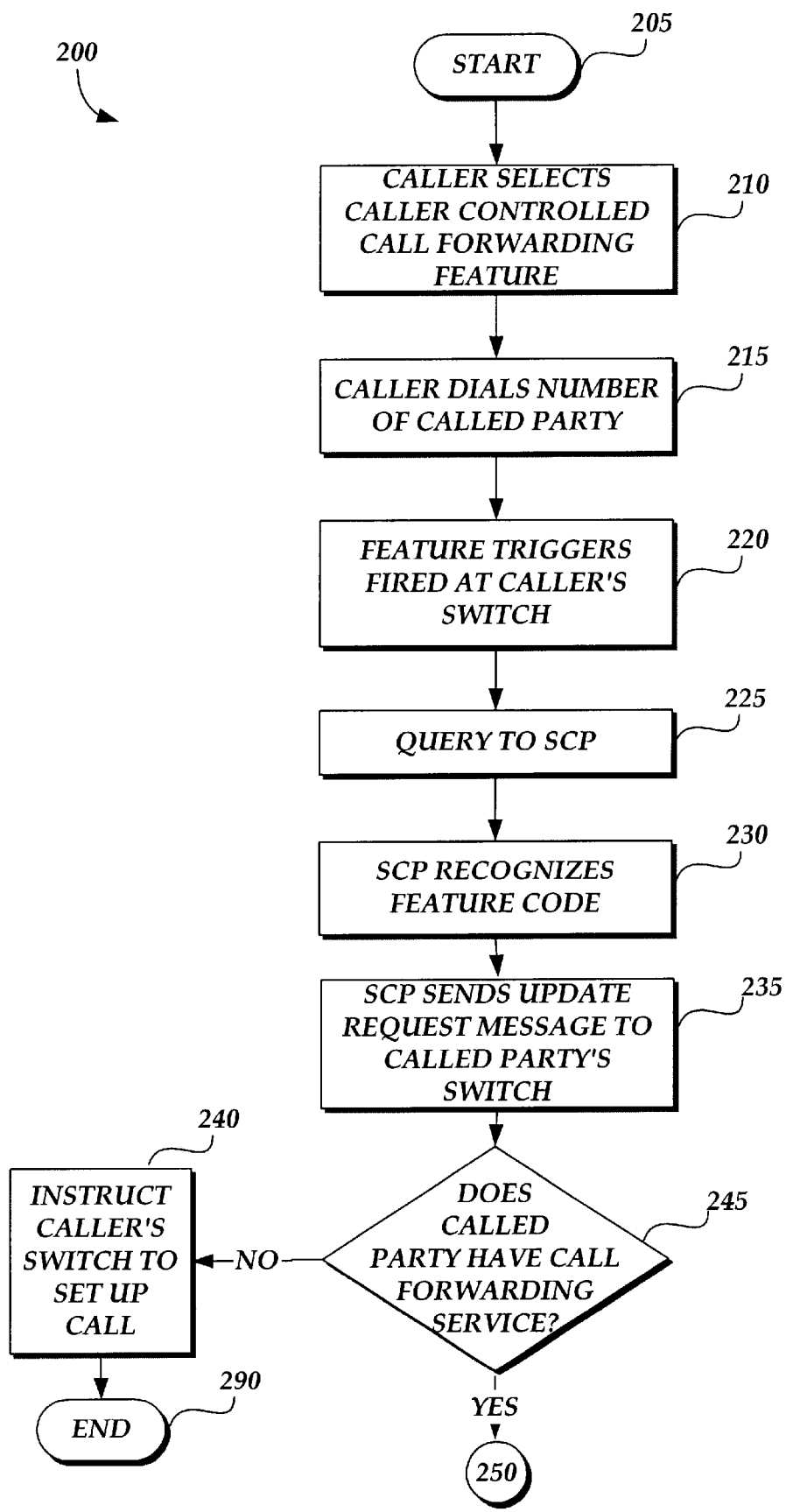
FIGS. 2 and 3 illustrate an operational flow of the steps performed by a method and system of the present invention in allowing a calling party to exercise control over telephone calls placed to a called party whose telephone line is provisioned with an activated call waiting feature.
Figure 3:
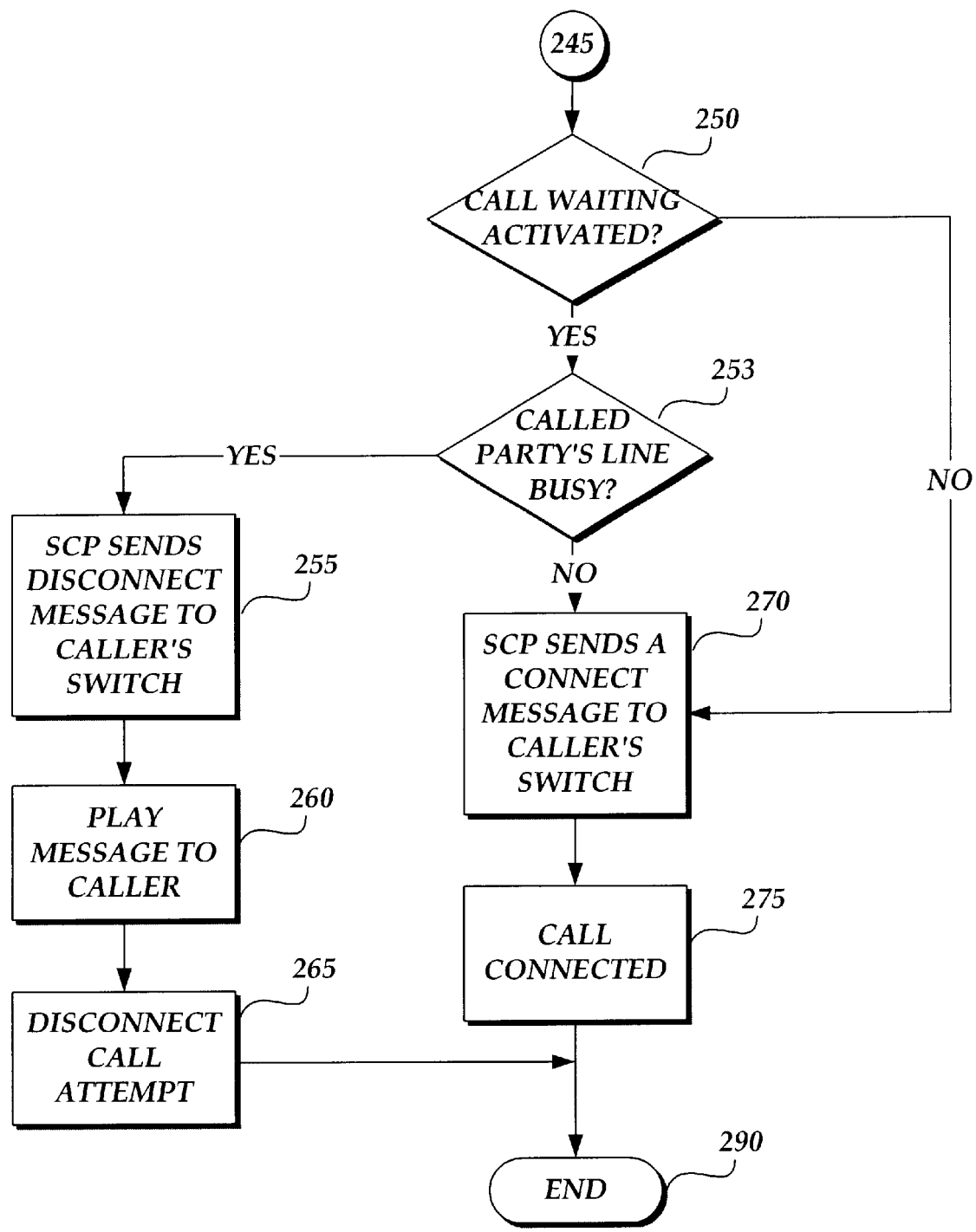

Having described an exemplary operating environment of the present invention with reference to FIG. 1, FIGS. 2 and 3 illustrate an operational flow of the steps performed by a method and system of the present invention in allowing a calling party to exercise control over telephone calls placed to a called party whose telephone line is provisioned with an activated call waiting feature.

With reference to the following description of FIGS. 2 and 3, assume for example that a called party subscribes to a call waiting feature on her local telephone line to alert her of incoming calls received while she is presently engaged in a telephone call. The method 200 begins at start step 205 and proceeds to step 210 where the calling party selects a call waiting control feature. In accordance with a preferred embodiment, the calling party selects the call waiting control feature by dialing a prescribed code on the telephone keypad of the calling party's telephone 21. For example, a code such as "*27" may be entered by the calling party at the telephone 21 in order to provision the call waiting control feature at the SSP 12.

Alternatively, if the calling party wishes to activate the call waiting control feature so that the feature operates at all times, and so that the calling party's calls are never put through to a telephone with an activated call waiting feature, the calling party may subscribe to the feature from her telecommunications service provider. In such a case, an off-hook delay trigger may be permanently provisioned at the SSP 12 to activate the call waiting control feature any time the calling party places a telephone call. According to a preferred embodiment, the call waiting control feature is activated on a call-by-call basis by entering the feature code, described above. Under this embodiment, the calling party may selectively decide when to utilize the call waiting control feature of the present invention.

At step 215, the caller dials the telephone directory number of the called party's telephone 24. At step 220, the calling party's switch 12 receives the call waiting control feature code entered by the calling party and the telephone directory number digits dialed by the calling party. In response to the feature code entered by the calling party, a feature code trigger is fired at the switch 12, and at step 225, a query is generated to the SCP 42 to process the call in accordance with the feature code and the telephone number digits entered by the calling party.

At step 230, the SCP 42 recognizes the feature code entered by the calling party as the call waiting control feature code. In response, at step 235, the SCP 42 determines whether call waiting service is provisioned on the line 20 of the called party. In order to determine whether the called party has call waiting service, the SCP 42 sends an Update Request message to the SSP. The SSP responds with an Update Data message to let the SCP know whether or not the called party's line is provisioned with a call waiting feature.

The status update request lets the SCP know if the call waiting feature is active on the called party's line. As should be understood, the called party may have subscribed to the call waiting feature, but the feature may not currently be active on the called party's line. For example, the feature may have been deactivated by the called party at the called party's line by selecting a deactivation code such as "*28" or the like. As is well known to those skilled in the art, a number of codes may be provided to telecommunications services subscribers for activating and de-activating call processing features on a case-by-case or call-by-call basis as desired by the subscriber. Or, the feature may not be operating due to a malfunction or other technical problem at the time the calling party places a call to the called party.

According to one embodiment, a preferred update status message sent from the SCP 42 to the called party switch 14 to determine the status of the call waiting service provisioned on the called party line 20 includes the following parameters.

Query_Request message:
UserID=Called Party Telephone Number
ProvideInfo
RequestGroups=RequestGroup1
RequestGroup1 {Service1=CallWaiting
Request1=ActivationStatus}

If the SSP 14 retrieves the data requested in the Query_Request message successfully, the SSP 14 sends a Query_Response Return Result to the SCP 42 including the following parameters.
InfoProvided
ActivationStateCode=off/on A response of "ActivationStateCode=off" indicates the call waiting feature is not active on the called party's line, and a response of "ActivationStateCode =on" indicates the call waiting feature is active on the called party's line. If the SSP 14 cannot respond to the request to retrieve any of the values requested in the ProvideInfo parameter, the SSP 14 sends a Query_Response Return Error to the SCP 42 containing the FailureCause parameter coded to "UnavailableResources". This response occurs when the requested data is invalid (e.g., the requested telephone line 20 does not subscribe to a call waiting feature). If the SSP returns a Return Error response, this indicates that the called party does not have call waiting feature. These SSP and SCP messages are specified in the Telcordia document GR-1298 and GR-1299 AINGR: Switching Systems, Issue 4, September. 1997, which is incorporated herein by reference.

At step 245, if the called party does not have call waiting service, the method proceeds to step 240, and the SCP 42 instructs the calling party's switch 12 to complete the call according to normal call set-up procedures. That is, as is understood by those skilled in the art, the trunk line 30 between the calling party's switch 12 and the called party's switch 14 is opened and the call is connected between the calling party from the telephone 21 to the called party at the telephone 24. The method then ends at step 290.

If the SCP 42 determines that the called party has subscribed to a call waiting service, the method proceeds to step 250, illustrated in FIG. 3. Referring now to FIG. 3, at step 250, the determination as to the status of the call waiting feature is made based on the response from the SSP 14 to the update request message. If the call waiting feature is not activated on the called party's line 20, the method proceeds to step 270, and the SCP 42 sends a message to the calling party's switch 12 to connect the call of the calling party to the called party at the called party's telephone 24. If at step 250 a determination is made that the call waiting feature is activated on the called party's line 20, the method proceeds to step 253, and a determination is made as to whether the called party's line 20 is busy. The determination as to whether the telephone line of the called party is busy or not is done by sending a Monitor_for_Change message from the SCP to the switch. The switch responds with a Status_Reported message including the busy status (or idle) of the line. As should be understood, if the called party's line is not busy, the call waiting feature is not invoked whether or not it is active on the called party's line.

If the called party's line is not busy, the method proceeds to step 270 and the calling party's switch 12 is instructed to connect the call to the called party, as described above. However, if at step 253 a determination is made that the called party's line is busy, the method proceeds to step 255, and the SCP 42 sends a disconnect message to the calling party's switch 12. At step 260, according to a preferred embodiment, a switch-based message may be played to the calling party at the calling party's telephone 21 such as "The called party has activated a call waiting feature. This call attempt is terminated." At step 265, the call attempt is terminated by the switch 12, and the method ends at step 290. Alternatively, the announcement may be provided to the calling party from the service node 55.

If at step 253 a determination is made that the called party's line is not busy, the method proceeds to step 270, and the SCP 42 sends a message to the switch 12 of the calling party to connect the call from the calling party's telephone 21 to the called party's telephone 24, as described above. At step 275 the call is completed, and method ends at step 290. As should be understood by those skilled in the art, completion of the call may result in reaching a voice mail service, or an unanswered call.

According to another embodiment, the SCP 42 may monitor the call waiting activation status and/or busy status of the line 20 of the called party for a prescribed period of time. According to this embodiment, a preformatted message may be played to the calling party after a determination has been made that the call attempt is to be terminated as described above. For example, the calling party may be instructed that for a small charge the call waiting status and/or busy status of the called party's line will be monitored for a prescribed period of time. If the call waiting status and/or busy status of the called party's line changes such that calls directed to the called party will not invoke the call waiting feature, the calling party may be notified of the change in the call waiting status and/or busy status so that the calling party may place the desired call to the called party. As should be understood by those skilled in the art, a network component such as a service node 55 may be utilized to request input from the calling party such as "press 1 to monitor the call waiting status of the called party's line, or press 2 to end this call."

According to an alternative embodiment, the call waiting control method and system described above may be network-based. According to a network-based method and system, the determination of the call waiting status and/or busy status of the called party's line is made at a network component such as the service control point 42. According to this embodiment, at steps 245, described above, rather than sending a message from the SCP 42 to the called party's switch 14 to determine the call waiting status of the called party's line 20, the service control point 42 performs a database search on the dialed digits of the called party's telephone directory number to determine the call waiting activation status of the called party's line 20. According to this embodiment, the call waiting activation status of a given telephone line 20 is controlled by a network component such as the SCP 42. According to the switch-based method as described above with reference to FIGS. 2 and 3, the call waiting activation status is controlled at the called party's switch 14.

As described herein, a method and system are provided for allowing a calling party to exercise control over telephone calls placed to a called party whose telephone line is provisioned with an activated call waiting feature. It will be apparent to those skilled in the art that various modifications or variations may be made to the present invention without departing from the scope or spirit of the invention. Other embodiments of the invention will be apparent to those skilled in the art from consideration of the specification and practice of the invention disclosed herein.

We claim:

1. A method for controlling calls placed to a called party whose telephone line is provisioned with a call waiting feature, comprising the steps of:

provisioning a call waiting control feature at a calling party switch;

entering a telephone directory number of a called party to place a call from a calling party to a called party;

determining whether a telephone line of the called party is provisioned with a call waiting feature;

determining a status of the call waiting feature;

determining whether the telephone line of the called party is busy; and if the call waiting feature is activated on the telephone line of the called party, and if the telephone line of the called party is busy, terminating a call attempt from the calling party to the called party.

2. The method of claim 1, prior to the step of terminating the call attempt from the calling party to the called party, further comprising the step of:

sending a call attempt termination instruction from a service control point to the calling party switch.

3. The method of claim 1, further comprising the step of:

playing a message to the calling party to notify the calling party that the called party has activated a call waiting feature and that the call attempt from the calling party to the called party is terminated.

4. The method of claim 1, further comprising the steps of:

monitoring at a service control point the status of the call waiting feature and the busy status of the telephone line of the called party;

notifying the calling party via the calling party switch if the status of the call waiting feature changes so that calls directed to the called party will not invoke the call waiting feature; and notifying the calling party via the calling party switch if a busy status of the telephone line of the called party changes so that calls directed to the called party will not invoke the call waiting feature.

5. The method of claim 1, further comprising the step of:

if the call waiting feature is not activated on the telephone line of the called party, connecting the call from the calling party to the called party.

6. The method of claim 1, further comprising the step of:

if the telephone line of the called party is not busy, connecting the call from the calling party to the called party.

7. The method of claim 5, prior to the step of connecting the call from the calling party to the called party, further comprising the step of:

sending a message from the service control point to the calling party switch to connect the call from the calling party to the called party.

8. The method of claim 6, prior to the step of connecting the call from the calling party to the called party, further comprising the step of:

sending a message from the service control point to the calling party switch to connect the call from the calling party to the called party.

9. The method of claim 1, wherein the step of provisioning a call waiting control feature at a calling party switch includes:

entering a call waiting control feature code at the calling party switch.

10. The method of claim 1, wherein the step of determining whether a telephone line of the called party is provisioned with a call waiting feature, further comprises the steps of:

querying a service control point to initiate the call waiting control feature; and at the service control point, determining whether the telephone line of the called party is provisioned with a call waiting feature based on the telephone directory number of the called party by sending an Update Request message to a called party switch.

11. The method of claim 1, wherein the step of determining a status of the call waiting feature further comprises:

sending a call waiting feature update request from a service control point to the called party switch.

12. The method of claim 11, further comprising the step of:

sending a status update response from the called party switch to the service control point indicating the status of the call waiting feature.

13. The method of claim 12, whereby sending a call waiting feature update request from a service control point to the called party switch includes sending a Query_Request message having a format of:

UserID=Called Party Telephone Number
ProvideInfo
   RequestGroups=RequestGroup1
      RequestGroup1 {Service1=CallWaiting Request1= ActivationStatus}.

14. The method of claim 13, whereby sending a status update response from the called party switch to the service control point indicating the status of the call waiting feature includes sending a response message having a format of:

InfoProvided
   ActivationStateCode=off/on;

whereby a response result of ActivationStateCode=on indicates the call waiting feature is active on the telephone line of the called party; and whereby a response result of ActivationStateCode=off indicates the call waiting feature is not active on the telephone line of the called party.

15. The method of claim 1, wherein the steps of determining a status of the call waiting feature and determining whether the telephone line of the called party is busy, further comprise the steps of:

querying a service control point to determine the status of the call waiting feature and a busy status of the telephone line of the called party;

at the service control point, determining a status of the call waiting feature; and at the service control point, determining whether the telephone line of the called party is busy by sending the Monitor_for_Change message to the switch, the switch responding with a Status_Reported message including the busy status of the line.

16. A system for controlling calls placed to a called party whose telephone line is provisioned with a call waiting feature, comprising:

a calling party switch operative
to receive provisioning of a call waiting control feature;
to receive a telephone directory number of a called party to place a call from a calling party to a called party;
to generate a query to a service control point to initiate the call waiting control feature;

the service control point operative
to determine whether a telephone line of the called party is provisioned with a call waiting feature;
to determine a status of the call waiting feature; and
to determine whether the telephone line of the called party is busy; and
to terminate a call attempt from the calling party to the called party if the call waiting feature is activated on the telephone line of the called party, and if the telephone line of the called party is busy.

17. The system of claim 16, whereby the service control point is further operative to send a call attempt termination instruction to the calling party switch if the call attempt is to be terminated.

18. The system of claim 16, whereby the calling party switch is further operative to play a message to the calling party to notify the calling party that the called party has activated a call waiting feature and that the call attempt from the calling party to the called party is terminated.

19. The system of claim 16, whereby the service control point is further operative to monitor the status of the call waiting feature and the busy status of the telephone line of the called party;

to cause calling party switch to notify the calling party if the status of the call waiting feature changes so that calls directed to the called party will not invoke the call waiting feature; and to cause the calling party switch to notify the calling party if a busy status of the telephone line of the called party changes so that calls directed to the called party will not invoke the call waiting feature.

20. The system of claim 16, whereby the calling party switch is further operative to receive instructions from the service control point to complete the call; and to connect the call from the calling party to the called party if the call waiting feature is not activated on the telephone line of the called party.

21. The system of claim 16, whereby the calling party switch is further operative to receive instructions from the service control point to complete the call; and to connect the call from the calling party to the called party if the telephone line of the called party is not busy.

22. The system of claim 16, whereby the service control point is further operative
to send a call waiting feature update request to the called party switch to determine the status of the call waiting feature; and the called party switch is operative
to send a status update response from to the service control point indicating the status of the call waiting feature.

23. The system of claim 22, whereby the update request includes a Query_Request message includes a format of:

UserID=Called Party Telephone Number
ProvideInfo
   RequestGroups=RequestGroup1
      RequestGroup1 {Service1=CallWaiting Request1= ActivationStatus}.

24. The system of claim 23, whereby the status update response includes a format of:

InfoProvided
   ActivationStateCode=off/on;

whereby a response result of ActivationStateCode=on indicates the call waiting feature is active on the telephone line of the called party; and whereby a response result of ActivationStateCode=off indicates the call waiting feature is not active on the telephone line of the called party.

25. The system of claim 24, whereby the status update response includes a format of:

FalureCause=Unavailable Resources, indicating that the call waiting feature is not subscribed to by the called party.

* * * * *

UNITED STATES PATENT AND TRADEMARK OFFICE
CERTIFICATE OF CORRECTION

PATENT NO. : 6,834,103 B1
DATED : December 21, 2004
INVENTOR(S) : Silver et al.

It is certified that error appears in the above-identified patent and that said Letters Patent is hereby corrected as shown below:

Column 9,
Lines 6-7, "sending an Update Request message" should read -- sending an Update_Request message --

Column 12,
Line 1, "FalureCause=Unavailable Resources," should read
-- FailureCause=Unavailable Resources, --

Signed and Sealed this

Tenth Day of May, 2005

JON W. DUDAS
*Director of the United States Patent and Trademark Office*